US008412969B2

(12) United States Patent
Hsiao

(10) Patent No.: US 8,412,969 B2
(45) Date of Patent: Apr. 2, 2013

(54) COMPUTER SYSTEM AND OVERCLOCK CONTROLLING METHOD AND PROGRAM THEREOF

(75) Inventor: Kun-Hsien Hsiao, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 421 days.

(21) Appl. No.: 12/768,737

(22) Filed: Apr. 28, 2010

(65) Prior Publication Data

US 2010/0281278 A1 Nov. 4, 2010

(30) Foreign Application Priority Data

Apr. 30, 2009 (TW) ................................ 98114410 A

(51) Int. Cl.
*G06F 1/00* (2006.01)

(52) U.S. Cl. ........................................ 713/322; 713/501

(58) Field of Classification Search .......... 713/500–503, 713/300–340
See application file for complete search history.

(56) References Cited

U.S. PATENT DOCUMENTS

| 5,760,636 | A | * | 6/1998 | Noble et al. .................... 327/513 |
| 5,812,860 | A | * | 9/1998 | Horden et al. ................. 713/322 |
| 6,094,367 | A | | 7/2000 | Hsu et al. |
| 6,622,254 | B1 | * | 9/2003 | Kao ............................... 713/500 |
| 6,907,535 | B2 | * | 6/2005 | Fang ............................... 713/322 |
| 7,110,932 | B2 | * | 9/2006 | Berthold et al. ................. 703/14 |
| 7,134,030 | B2 | * | 11/2006 | Wang .............................. 713/320 |
| 7,149,911 | B2 | * | 12/2006 | Yeh .................................. 713/322 |
| 7,219,252 | B1 | * | 5/2007 | Li et al. .......................... 713/501 |
| 7,249,275 | B2 | * | 7/2007 | Weng et al. .................... 713/501 |
| 7,257,721 | B2 | * | 8/2007 | Chung et al. .................. 713/300 |
| 7,276,925 | B2 | * | 10/2007 | Dobberpuhl et al. ....... 324/750.3 |
| 7,382,366 | B1 | * | 6/2008 | Klock et al. .................... 345/213 |
| 7,467,318 | B2 | * | 12/2008 | Bruno et al. .................... 713/500 |
| 7,495,502 | B2 | * | 2/2009 | Weder et al. ................... 327/538 |
| 7,689,847 | B2 | * | 3/2010 | Chang et al. ................... 713/322 |
| 7,913,071 | B2 | * | 3/2011 | Mallik et al. ....................... 713/1 |
| 8,245,075 | B2 | * | 8/2012 | Chien ............................ 713/600 |
| 2004/0168096 | A1 | * | 8/2004 | Yeh ................................ 713/300 |

FOREIGN PATENT DOCUMENTS

CN 101051271 10/2007
WO WO 2005073828 A2 * 8/2005

* cited by examiner

*Primary Examiner* — Paul R Myers
(74) *Attorney, Agent, or Firm* — Jianq Chyun IP Office

(57) ABSTRACT

A computer system and overclock controlling method and program thereof, which includes steps of providing an overclock work voltage to a CPU when overclock is requested, then the CPU adjusts its clock domain according to the overclock work voltage. The overclock work voltage is a sum of a normal work voltage and an additional external voltage, by which the CPU may enter an overclock mode (a frequency of a clock domain signal is higher than a standard frequency value). Eventually, when the frequency of the clock domain signal of the CPU is in a stable status during the overclock mode, the work voltage for the CPU is reduced and the CPU keeps working in the overclock mode.

14 Claims, 5 Drawing Sheets

COMPUTER SYSTEM AND OVERCLOCK CONTROLLING METHOD AND PROGRAM THEREOF

CROSS-REFERENCE TO RELATED APPLICATION

This application claims the priority benefit of Taiwan application serial no. 98114410, filed on Apr. 30, 2009. The entirety of the above-mentioned patent application is hereby incorporated by reference herein and made a part of specification.

BACKGROUND OF THE INVENTION

1. Field of the Invention

The present invention is relative to overclock control, and more particularly, to a computer system and overclock controlling method and program thereof.

2. Description of the Related Art

Overclocking is the process of running a computer component at a higher clock rate (more clock cycles per second) than it was designed for or was specified by the manufacturer, usually practiced by enthusiasts seeking an increase in the performance of their computers. Some purchase low-end computer components which they then overclock to higher clock rates, or overclock high-end components to attain levels of performance beyond the specified values. Others overclock outdated components to keep pace with new system requirements, rather than purchasing new hardware.

There are several methods to overclock. The most traditional method is detaching the casing and adjusting a jumper on the motherboard, with such to change a frequency of the clock rate. However, this method is very inconvenient to implement, otherwise, may damage components during detaching the casing and adjusting motherboard.

Nowadays, with highly development of semiconductor technology, function of said jumper is mostly taken by electronic switching devices. So, for present computers, overclocking is able to be performed by software setting. Generally speaking, the software setting can be completed in BIOS (Basic Input/Output System), or in OS (Operating System) by performing a dynamic overclocking.

However, during the dynamic overclocking, assuming that the user overclock the clock rate of a CPU from 200 MHz to 220 MHz, actually, the clock rate is not stably operating at set 220 MHz immediately. Instead, the clock rate of the CPU vibrates between 200 MHz~240M for a while, then gradually come into a stable status. During the vibration, CPU is easily affected by external interference and leads to an abnormal operation.

Therefore, maintaining a normal operation of CPU during the dynamic overclocking becomes a very important subject.

BRIEF SUMMARY OF THE INVENTION

The invention provides an overclock controlling method to protect a computer system and keep a stable operation when overclocking.

Furthermore, the invention provides an overclocking control program to handle overclocking and guarantees a stable operation of the computer system.

The present invention provides a computer system including a CPU, a power module, a clock generator and a control module. The control module may be installed in an operation system and is coupling with the power module and the clock generator and generates a work voltage and a clock domain signal to the CPU.

When the control module receives an overclocking request, the control module controls the power module to add a rated voltage and an external voltage to a current work voltage to generate a temporary work voltage value, and the clock generator to increase a frequency of the clock domain signal till achieve a target value provided by the overclocking request. After the frequency of the clock domain signal is increased and stabilized, the control module controls the power module to decrease the temporary work voltage value by the external voltage value and generates a new work voltage.

Furthermore, the clock generator may include a Phase Locked Loop Circuit having a sampling cycle.

From other aspect, the present invention further provides an overclock controlling method for a computer system, the method comprises steps of: providing a work voltage and a clock domain signal to a CPU; when a frequency of the clock domain signal need to be adjusted, a rated voltage and an external voltage are added to the work voltage according to a demanded adjustment value of the frequency of the clock domain signal, to obtain a temporary work voltage value. Then the frequency of the clock domain signal is adjusted. And determining if the frequency of the clock domain signal is adjusted and stabilized, the temporary work voltage value is diminished by a value of the external voltage, and thus a new work voltage is obtained.

From a further aspect, the present invention provides an overclock controlling program, which is applied to a computer system. The steps of the overclock controlling program comprises:

adding a rated voltage and an external voltage to a work voltage when receiving an overclocking request, according to a content of the overclocking request, to gain a temporary work voltage value. Changing a frequency of a clock domain signal of a CPU to a set target value. And, determining if the frequency of the clock domain signal achieves the target value and is stabilized, and diminishing the temporary work voltage by a value of the external voltage to obtain a new work voltage after the frequency of the clock domain signal is adjusted and stabilized.

According to a preferred embodiment of present invention, the step of determining if the frequency of the clock domain signal achieves the target value and is stabilized, and diminishing the temporary work voltage by a value of the external voltage to obtain a new work voltage after the frequency of the clock domain signal is adjusted and stabilized includes: Once the frequency of the clock domain signal achieves the target value, a sampling for the clock domain signal is performed, may by the control module, after a unit of time repeatedly, to detect a condition of the frequency change of the clock domain signal. If the sampling continuously obtain values minor than a set value for N times, then the frequency of the clock domain signal is determined to be stabilized. Notely, said N is a predetermined positive integer.

Besides, mentioned determined time (such as mentioned N times) may be a sampling cycle of the Phase Locked Loop Circuit.

From above description, it is known that the present invention allows an addition of a rated voltage, plus an external voltage, before adjustment of the frequency of the clock domain signal. Therefore, during a vibration of the frequency of the clock domain signal, the CPU may keep working in a stable operation.

These and other features, aspects and advantages of the present invention will become better understood with regard to the following description, appended claims, and accompanying drawings.

DETAILED DESCRIPTION OF THE EMBODIMENTS

Figure 1:
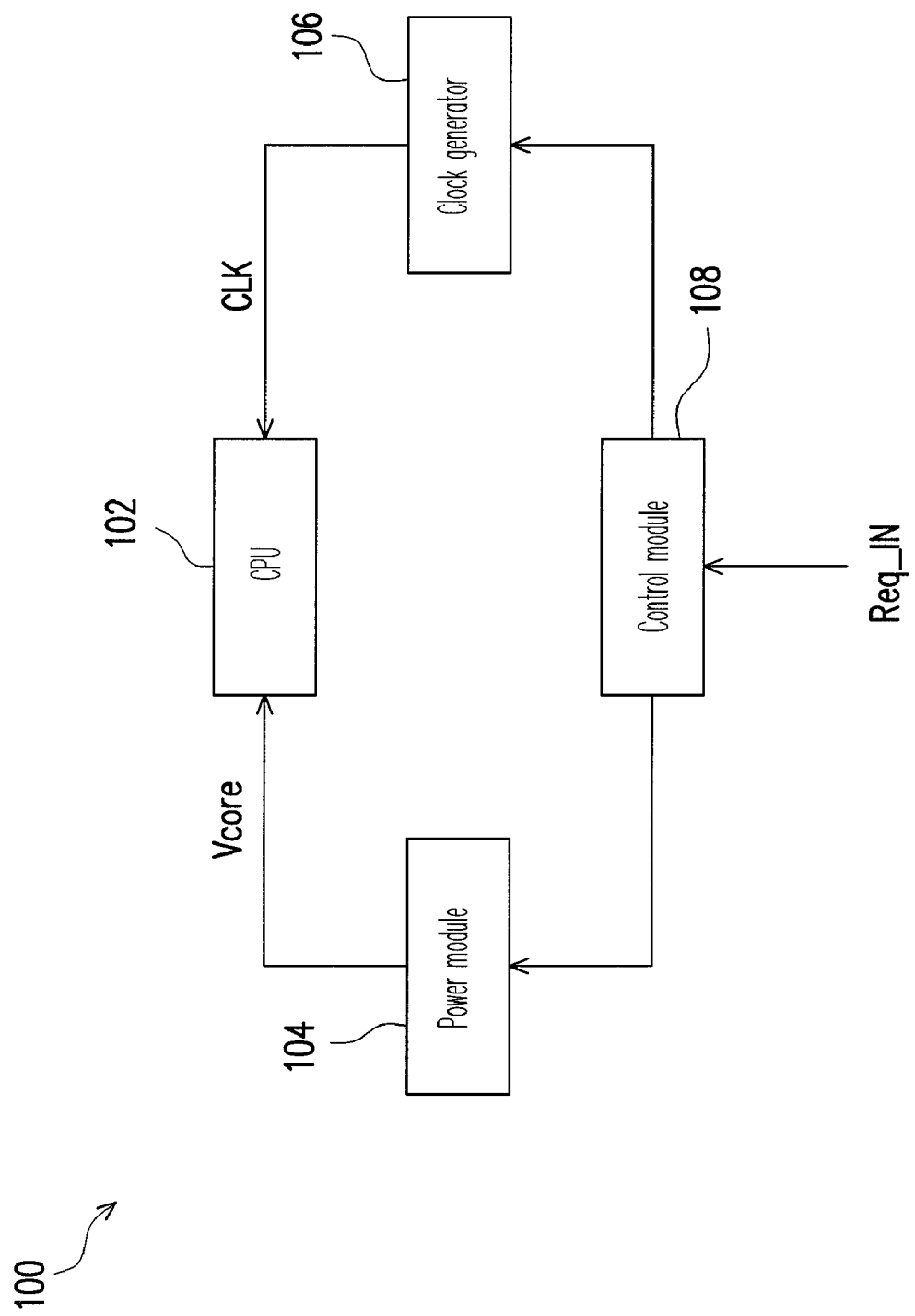
FIG. 1 is a block diagram showing a computer system in accordance with an embodiment of present invention.

FIG. 1 is a block diagram showing a computer system in accordance with an embodiment of present invention. With reference to FIG. 1, the computer system 100 of the embodiment comprises a CPU (Central Processing Unit) 102, a power module 104, a clock generator 106 and a control module 108. The power module 104 and the clock generator 106 is couple to the CPU 102 and the control module 108 respectively. In other further embodiments, the control module 108 may be a software application that installed in an operation system.

The power module 104 is controllably providing the CPU 102 a work voltage Vcore. The clock generator 106 provides the CPU 102 a clock domain signal CLK. Mentioned clock generator 106 may include a Phase Locked Loop Circuit and has a signal sampling cycle which is implemented in applications described below.

Figure 2:
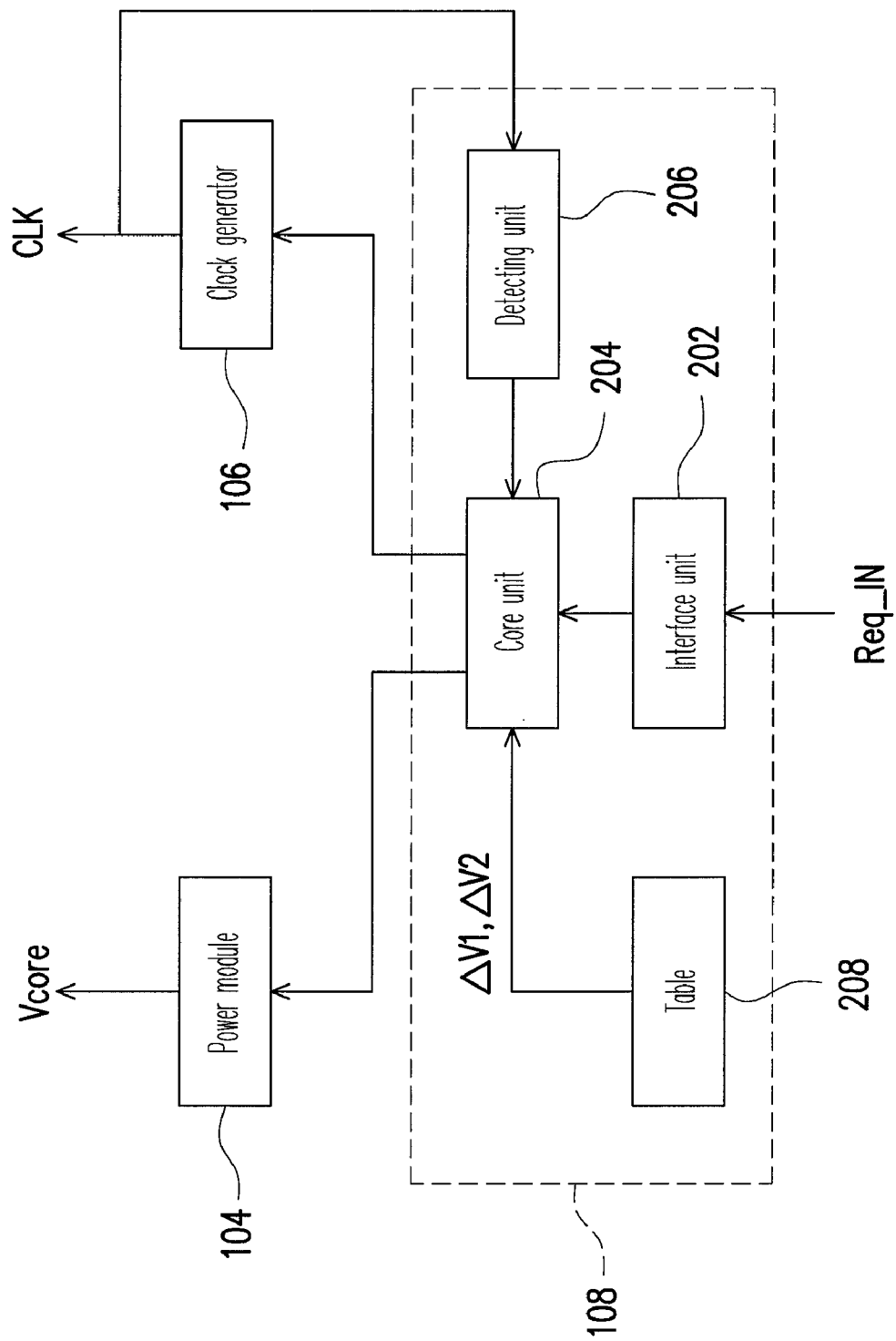
FIG. 2 is a block diagram showing a control module in accordance with an embodiment of present invention.

FIG. 2 is a block diagram showing a control module in accordance with an embodiment of present invention. With reference to FIG. 2, the control module 108 of the embodiment at least comprises an interface unit 202, a core unit 204 and a detecting unit 206. The core unit 204 is coupling to the interface unit 202 and the detecting unit 206, respectively, and may respectively connect to the power module 104 and the clock generator 106. In addition, the detecting unit 206 may receive the clock domain signal CLK output from the clock generator 106. In other further embodiments, the control module 108 may has a table 208 which may be configured by the manufacturer and contains rated voltage values and external voltage values that corresponding to different frequency value of the clock domain signal. The usage of mentioned table 208 will be illustrated under below.

Please keep referring to FIG. 2, the interface unit 202 may receive a user demand Req_IN and send the user demand Req_IN to the core unit 204 for processing. In some further embodiment, the interface unit 202 may display an user interface on a monitor of the computer system 100 to accelerate user operation.

When receiving the user demand Req_IN from the interface unit 202, the core unit 204 reads and determines the user demand Req_IN. If the received user demand Req_IN is determined to be a frequency adjustment request, which represents a requirement to adjust a frequency of the clock domain signal, the core unit 204 obtains a rated voltage $\Delta V1$ and an external voltage $\Delta V2$ from the table 208, according to a demanded adjustment value of the frequency of the clock domain signal, and send the rated voltage $\Delta V1$ and the external voltage $\Delta V2$ to the power module 104. With such, the core unit 204 may control the power module 104 to add the work voltage Vcore with the rated voltage $\Delta V1$ and the external voltage $\Delta V2$ to obtain a temporary work voltage value Vcore_temp. Above description may be represented by following formula:

$$Vcore\_temp = Vcore + \Delta V1 + \Delta V2$$

Note that at the beginning of the adjustment of the frequency of the clock domain signal CLK, the frequency may not directly reach the set value. For example, when adjusting a frequency of the clock domain signal CLK from 200 MHz to 220 MHz, at the beginning, the frequency of the clock domain signal CLK may surge to 240 MHz. With such condition, if the work voltage Vcore is added only with the rated voltage $\Delta V1$, the CPU 102 may be fail due to a low power. Thus, in present embodiment, not only the rated voltage $\Delta V1$ is added to the work voltage Vcore, but also an external voltage $\Delta V2$ is added thereto. So, even if a frequency of the clock domain signal CLK go beyond a set value, the CPU102 still remain a normal operation.

Figure 3:
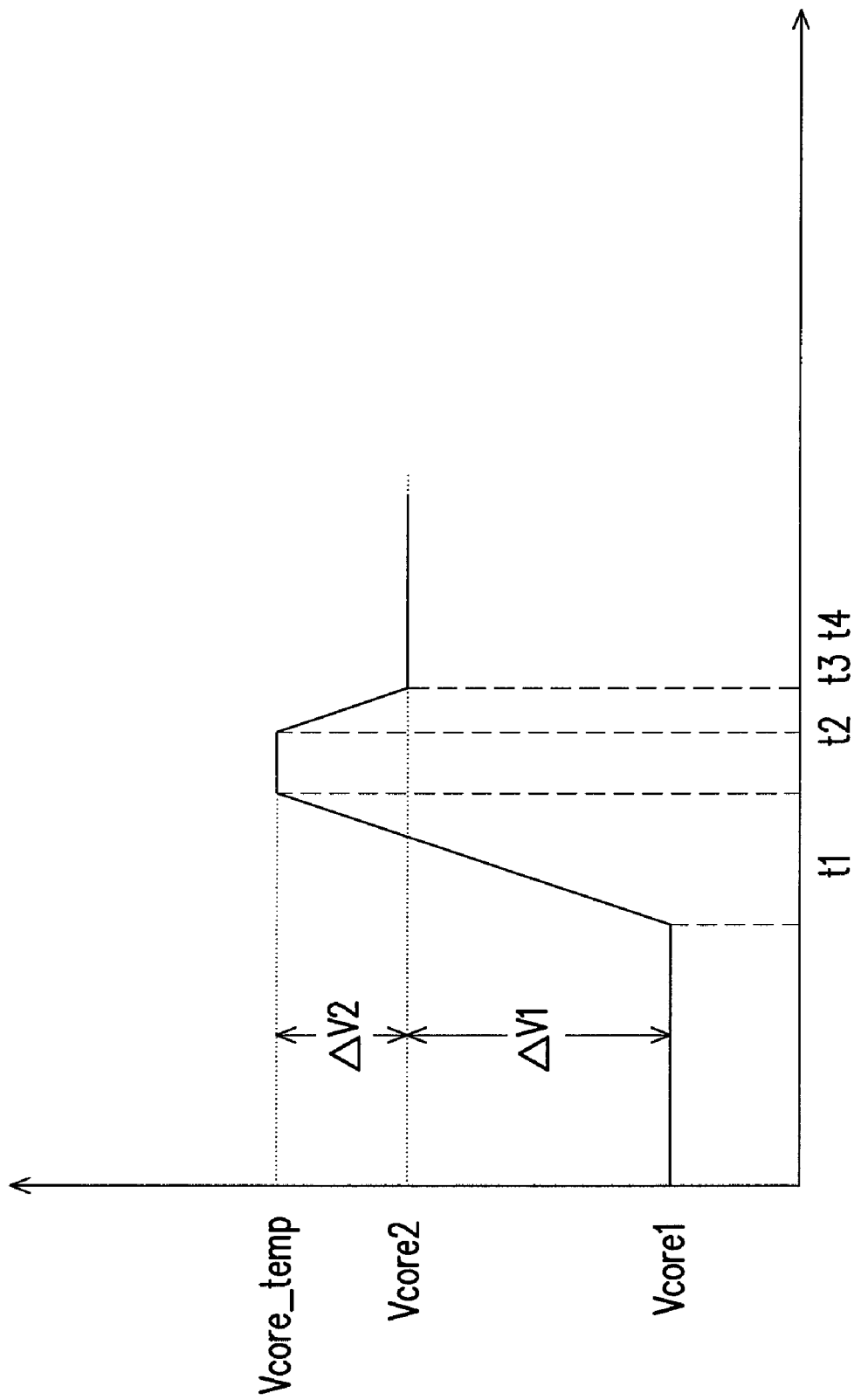
FIG. 3 is a voltage variation chart showing a voltage trend of the work voltage Vcore during overclocking.

FIG. 3 is a voltage variation chart showing a voltage trend of the work voltage Vcore during overclocking. With reference to FIGS. 2 and 3, when at t1, the core unit 204 send the rated voltage $\Delta V1$ and the external voltage $\Delta V2$ to the power module 104, then, the core unit 204 controls the power module 104 to change, may be raise, a level of the work voltage Vcore, thereby present work voltage Vcore 1 is increased to a temporary work voltage value Vcore_temp. At t2, when the level of the work voltage Vcore reaches the temporary work voltage value Vcore_temp, the core unit 204 may control the clock generator 106, according to an user request Req_IN, to adjust a frequency of the clock domain signal CLK.

After the clock generator 106 complete the adjustment of the frequency of the clock domain signal CLK, the detecting unit 206 start to detect a stabilization of the clock domain signal CLK. When at t3, once the detecting unit 206 confirms that the frequency of the clock domain signal CLK is stably maintained at the set value determined by the user request Req_IN, the core unit 204 controls the power module 104 to diminish the temporary work voltage value Vcore_temp by the external voltage $\Delta V2$ to obtain a new work voltage value Vcore2 for the CPU102 when at t4. Above description may be represented by following formula:

$$Vcore2 = Vcore\_temp - \Delta V2 = Vcore1 + \Delta V1$$

Figure 4:
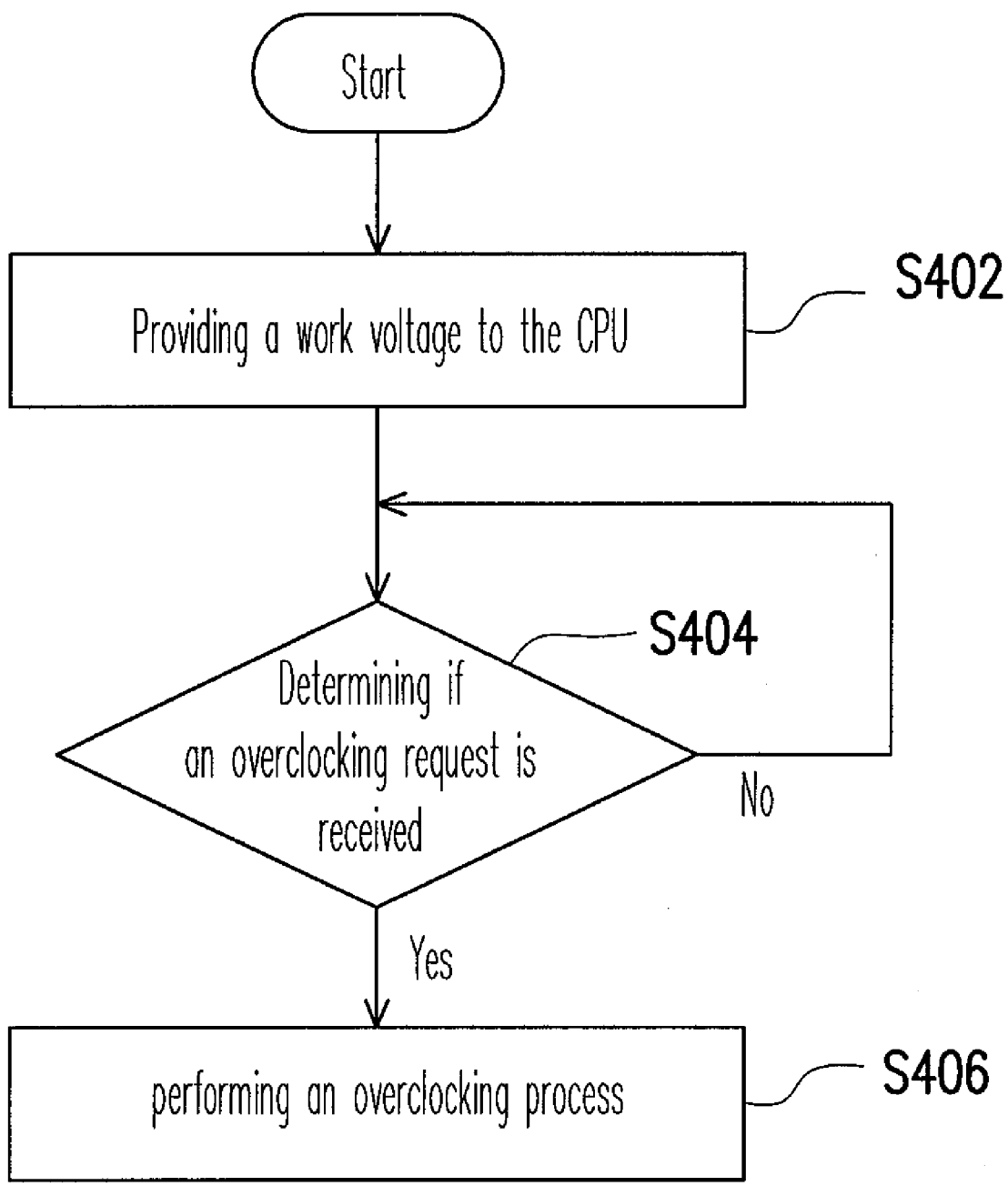
FIG. 4 is a flow chart showing an overclock controlling method in accordance with an embodiment of present invention.

FIG. 4 is a flow chart showing an overclock controlling method in accordance with an embodiment of present invention. With reference to FIG. 4, the overclock controlling method comprises:

As described in step S402, a work voltage is provided to the CPU. Then the frequency of the clock domain signal of the CPU will be higher than a set value.

As described in step S404, when an overclocking request is received (means "Yes" in step S404), performs an overclocking process as step S406.

Figure 5:
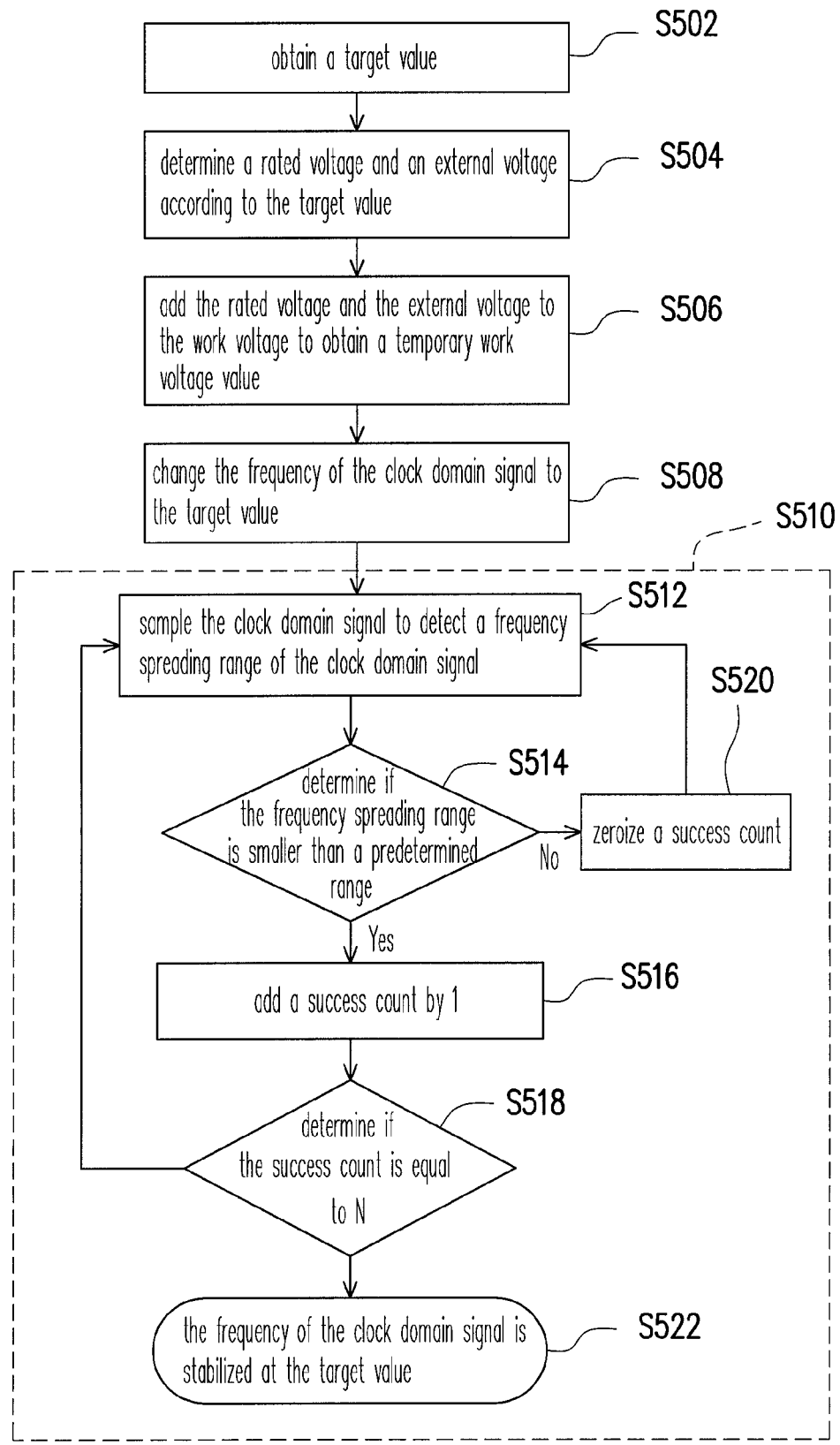
FIG. 5 is a flow chart showing an overclocking process in accordance with an embodiment of present invention.

FIG. 5 is a flow chart showing an overclocking process in accordance with an embodiment of present invention. With reference to FIG. 5, when the overclocking request is received, as step S502, read and determine a content of the overclocking request to obtain a target value. Therewith, a rated voltage and an external voltage are obtained according to the target value, as step S506. Particularly, in present embodiment, the rated voltage and the external voltage are added to the work voltage mentioned in step S402 and thus to obtain a temporary work voltage value.

After the temporary work voltage value is obtained, step S508 is performed, that is, raising the frequency of the clock domain signal to the target value. As described in step S510, determining if the frequency of the clock domain signal achieves the target value and is stabilized, and diminishing the temporary work voltage by a value of the external voltage to obtain a new work voltage after the frequency of the clock domain signal is adjusted and stabilized.

For detail of step S512, when the frequency of the clock domain signal achieves the target value, a sampling is performed after a unit of time, repeatedly, to detect a frequency spreading range of the clock domain signal. Besides, mentioned determined time may be a sampling cycle of the Phase Locked Loop Circuit.

Once the frequency spreading range of the clock domain signal is obtained, step S514 is performed. That is, determining whether the frequency spreading range is smaller than a predetermined range, such as 1%. If the frequency spreading range is smaller than the predetermined range (means "Yes" in step S514), add a success count by 1, as step S516, and perform step S518 to determine whether the success count is equal to N. Said N is a predetermined positive integer, such as 3. In step S518, if the success count is not equal to N (means "No" in step S518), then step S512 of present embodiment is performed again.

Accordingly, while performing step S514, if the frequency spreading range is exceeding the predetermined range (means "No" in step S514), step S520 is performed to zeroize the success count, then to perform step S512. Above mentioned steps are performed until the success count equal to N (means "Yes" in step S518), then, as described in step S522, it is determined that the frequency of the clock domain signal is stabilized at the target value. The time spent from step S512 to step S522 is about t2 to t3 in FIG. 3.

Notely, since not only the rated voltage, but also the external voltage is added to the work voltage when overclocking, a surging frequency of the clock domain signal will not cause a fail of the CPU. Additionally, after the frequency of the clock domain signal is stabilized, a new work voltage is obtained by diminishing the temporary work voltage value Vcore_temp by the external voltage, thereby avoids energy consuming.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A computer system, comprises:
 a CPU;
 a power module coupling to the CPU and providing a work voltage to the CPU;
 a clock generator coupling to the CPU and providing a clock domain signal to the CPU; and
 a control module coupling to the power module and the clock generator, wherein the control module controls the power module to add a rated voltage and an external voltage to the work voltage to obtain a temporary work voltage value when receiving an overclocking request, and controls the clock generator to change the frequency of the clock domain signal to a target value provided by the overclocking request, after the frequency of the clock domain signal is adjusted and stabilized, the control module controls the power module to diminish the temporary work voltage by a value of the external voltage to obtain a new work voltage, and
 wherein when the frequency of the clock domain signal achieves the target value, the control module performs a sampling for the clock domain signal after a unit of time, repeatedly, to detect a frequency spreading range of the clock domain signal; if the sampling continuously obtain frequency spreading ranges that are smaller than a predetermined range for N times, then the power module is controlled by the control module to diminish the temporary work voltage by a value of the external voltage to obtain a new work voltage; wherein N is a predetermined positive integer.

2. The computer system according to claim 1, further has a table containing rated voltage values and external voltage values that corresponding to different frequency value of the clock domain signal.

3. The computer system according to claim 1, wherein the control module is installed in an operation system.

4. The computer system according to claim 1, wherein the clock generator is a Phase Locked Loop Circuit.

5. The computer system according to claim 4, wherein the unit of time is a sampling cycle of the Phase Locked Loop Circuit.

6. The computer system according to claim 1, wherein the predetermined range is 1%.

7. The computer system according to claim 1, wherein N is 3.

8. An overclock controlling method for a computer system, comprising:
 providing a work voltage to a CPU;
 providing a clock domain signal to the CPU;
 adding a rated voltage and an external voltage to the work voltage to obtain a temporary work voltage;
 adjusting a frequency of the clock domain signal;
 determining if the frequency of the clock domain signal achieves the target value and is stabilized, and diminishing the temporary work voltage by a value of the external voltage to obtain a new work voltage after the frequency of the clock domain signal is adjusted and stabilized;
 sampling the clock domain signal after a unit of time, repeatedly, to detect a frequency spreading range of the clock domain signal after the frequency of the clock domain signal is adjusted; and
 determining the frequency of the clock domain signal to be stabilized if the sampling continuously obtain frequency spreading ranges that are smaller than a predetermined range for N times; wherein N is a predetermined positive integer.

9. The overclock controlling method according to claim 8, wherein the predetermined range is 1%.

10. The overclock controlling method according to claim 8, wherein N is 3.

11. An overclock controlling program applying to a computer system, comprises following steps:
 determining if an overclocking request is received;
 adding a rated voltage and an external voltage when an overclocking request received, according to the overclocking request, to the work voltage to obtain a temporary work voltage;
 changing the frequency of a clock domain signal to a target value provided by the overclocking request;
 determining if the frequency of the clock domain signal achieves the target value and is stabilized, and diminishing the temporary work voltage by a value of the external voltage to obtain a new work voltage after the frequency of the clock domain signal is adjusted and stabilized;

sampling the clock domain signal after a unit of time, repeatedly, to detect a frequency spreading range of the clock domain signal after the frequency of the clock domain signal achieves the target value; and determining the frequency of the clock domain signal to be stabilized if the frequency spreading ranges of the sampling continuously obtained that are smaller than a predetermined range for N times; wherein N is a predetermined positive integer.

12. The overclock controlling program according to claim 11, wherein the value of the rated voltage and the value of the external voltage is obtained from a table.

13. The overclock controlling program according to claim 11, wherein the predetermined range is 1%.

14. The overclock controlling program according to claim 11, wherein N is 3.

* * * * *